(12) United States Patent
Pangrcic

(10) Patent No.: US 7,827,732 B2
(45) Date of Patent: Nov. 9, 2010

(54) FISH CATCHER

(76) Inventor: Robert A. Pangrcic, 1104 5th St., LaSalle, IL (US) 61301

( * ) Notice: Subject to any disclaimer, the term of this patent is extended or adjusted under 35 U.S.C. 154(b) by 0 days.

(21) Appl. No.: 10/686,250

(22) Filed: Oct. 15, 2003

(65) Prior Publication Data

US 2005/0081423 A1    Apr. 21, 2005

(51) Int. Cl.
*A01K 97/00* (2006.01)
*A01K 97/04* (2006.01)

(52) U.S. Cl. .................. 43/54.1; 43/4; 43/56; 43/100

(58) Field of Classification Search .............. 43/4, 43/11, 7, 8, 12, 54.1, 55, 56, 100, 103, 105; 119/200, 201, 216; D22/121, 122, 135, 136
See application file for complete search history.

(56) References Cited

U.S. PATENT DOCUMENTS

| | | | | |
|---|---|---|---|---|
| 130,631 A * | 8/1872 | Frazier | ...................... | 119/201 |
| 483,079 A * | 9/1892 | McAdams | ................... | 43/134 |
| 1,406,581 A * | 2/1922 | Pick | ........................ | 210/485 |
| 2,502,816 A * | 4/1950 | Bennek | ......................... | 43/4 |
| 2,527,046 A * | 10/1950 | Wold | .......................... | 405/40 |
| 2,531,551 A * | 11/1950 | Brecht et al. | .................... | 43/4 |
| 2,611,982 A * | 9/1952 | Sears | .............................. | 43/4 |
| 2,800,737 A * | 7/1957 | Crossan | ........................ | 43/12 |
| 2,883,783 A * | 4/1959 | Del Matter | ...................... | 43/4 |
| 3,059,369 A * | 10/1962 | Swanson | ........................ | 43/4 |
| 3,354,575 A * | 11/1967 | Darrow | ......................... | 43/56 |
| 3,418,916 A * | 12/1968 | Peirce | ......................... | 99/305 |
| 3,541,722 A * | 11/1970 | Garrison | ......................... | 43/66 |
| 3,753,308 A * | 8/1973 | Swanson | ......................... | 43/4 |
| 3,815,272 A * | 6/1974 | Marleau | ......................... | 43/12 |
| 3,879,879 A * | 4/1975 | Bobo | ............................. | 43/4 |
| 3,900,982 A * | 8/1975 | Gale | .............................. | 43/7 |
| 3,949,510 A * | 4/1976 | Johnson | ......................... | 43/4 |
| 3,958,356 A * | 5/1976 | Clingan | ......................... | 43/4 |
| D244,372 S * | 5/1977 | Kirkhart | ................... | D22/136 |
| 4,060,923 A * | 12/1977 | Schmitz | ......................... | 43/4 |
| 4,118,807 A * | 10/1978 | McCauley | ...................... | 43/4 |
| 4,263,864 A * | 4/1981 | Carter et al. | ............. | 114/221 R |
| 4,291,690 A * | 9/1981 | Jessen | ................... | 128/207.29 |
| D265,158 S * | 6/1982 | Green, II | .................. | D10/46.2 |
| 4,399,629 A * | 8/1983 | Duncan | ......................... | 43/4 |
| 4,516,289 A * | 5/1985 | Sumerau | ....................... | 15/410 |
| 4,585,437 A * | 4/1986 | Simms | ........................ | 604/106 |
| 4,767,141 A * | 8/1988 | Martin | ........................ | 294/50 |
| 4,815,227 A * | 3/1989 | Flanders, Sr. | .................. | 43/11 |

(Continued)

OTHER PUBLICATIONS

"Plastic Coffee Mugs" Jan Way, Mar. 11, 2002 http://web.archive.org/web/20020311234433/http://janway.com/plastic-mugs.htm.*

(Continued)

*Primary Examiner*—Tien Dinh
*Assistant Examiner*—Joseph W Sanderson
(74) *Attorney, Agent, or Firm*—Greer, Burns & Crain, Ltd.

(57) ABSTRACT

A fish catcher having a handle connected to a base wherein the base is tubular in shape having two ends. On a first end is a large opening less than the diameter of the tube. On the second or distal end is an opening smaller than the large opening. The body is made of an opaque rigid material.

11 Claims, 4 Drawing Sheets

U.S. PATENT DOCUMENTS

| | | | | |
|---|---|---|---|---|
| D302,639 S | * | 8/1989 | Charm | D7/691 |
| 4,965,955 A | * | 10/1990 | Campbell et al. | 43/4 |
| D336,508 S | * | 6/1993 | Mathews | D22/135 |
| 5,396,666 A | * | 3/1995 | Tsai et al. | 4/325 |
| 5,408,900 A | * | 4/1995 | Marui | 74/551.4 |
| 5,442,875 A | * | 8/1995 | Brundage et al. | 43/11 |
| 5,465,522 A | * | 11/1995 | Varda | 43/4 |
| 5,549,227 A | * | 8/1996 | Klotz | 222/461 |
| 5,556,069 A | * | 9/1996 | Malmberg | 248/291.1 |
| 5,560,109 A | * | 10/1996 | Lam | 30/325 |
| D379,576 S | * | 6/1997 | Byrd | D8/11 |
| 5,775,023 A | * | 7/1998 | Botkins | 43/4 |
| 5,845,431 A | * | 12/1998 | Waite | 43/54.1 |
| 5,971,653 A | * | 10/1999 | Harpell | 403/97 |
| 6,032,399 A | * | 3/2000 | DePoe | 43/12 |
| 6,386,726 B1 | * | 5/2002 | Macierowski et al. | 362/102 |
| 6,438,892 B1 | * | 8/2002 | Oberman et al. | 43/55 |
| 6,463,662 B1 | * | 10/2002 | Coscia et al. | 30/141 |
| 7,036,263 B2 | * | 5/2006 | Yang et al. | 43/11 |
| 7,441,676 B2 | * | 10/2008 | Pickering, Jr. | 222/460 |
| 2001/0036124 A1 | * | 11/2001 | Rubenstein | 366/205 |
| 2002/0020104 A1 | * | 2/2002 | Kolar et al. | 43/55 |
| 2003/0102416 A1 | * | 6/2003 | Adams | 248/289.31 |
| 2004/0217246 A1 | * | 11/2004 | Adams | 248/291.1 |
| 2006/0185215 A1 | * | 8/2006 | Corbett | 43/7 |
| 2006/0207159 A1 | * | 9/2006 | Lee | 43/7 |
| 2008/0072832 A1 | * | 3/2008 | Novella | 119/161 |

OTHER PUBLICATIONS

"Sifters and Shakers" Fantes, Aug. 10, 2002 http://web.archive.org/web/20020810170824/http://www.fantes.com/sifters_shakers.htm.*

* cited by examiner

FISH CATCHER

BACKGROUND OF THE INVENTION

1. Field of the Invention

This invention relates generally to sporting equipment. More specifically it relates to fishing tackle that facilitates the baiting of a hook.

2. Description of the Prior Art

When going fishing, many fishermen decide to use live bait. Sometimes they use crickets or nightcrawlers and sometimes they use baitfish. Although nightcrawlers are not difficult to catch, crickets and baitfish are notorious for the difficulties that they impose on fishermen. Specifically minnows, chubs, suckers and other baitfish pose the most problems. Similar problems may also be encountered in pet shops when trying to only catch one fish.

Minnows are often sold in two sizes—"small" and "large". "Small" minnows are smaller than the "large" minnows, but there is no set size from bait shop to bait shop. Similarly, "large" minnows are larger than the "small" minnow size, but again, there is no set size for "large" minnows. Sometimes it is important to fish with "large" minnows and sometimes it is necessary to fish with "small" minnows.

The baitfish are purchased at a bait shop and thrown into a bucket where they can swim and stay alive. They swim around waiting for the fisherman to use them as bait. The fisherman then tries to capture one for baiting his hook. Typically, he will use a small hand held net. The fisherman swirls the net in the bucket trying to capture only one baitfish. Inevitably, the fisherman grabs more than one and often has 4-7 fish in the net. The next trick is to try to grab one from the net and place it the fisherman's hand so that he can bait the hook. The problem is that the baitfish are small and they are not easily grabbed with fingers because they are wet and slimy. Additionally, because there are so many fish in the net, that it is difficult still to grab only one baitfish. Inevitably, one or two baitfish flip out of the net onto the ground and are wasted, thus requiring a fisherman to purchase far more baitfish than he actually uses. Additionally, the baitfish almost adhere themselves to the fine netting so that even if the fisherman's fingers grab one bait fish, in order to remove it out of the net, the fisherman must apply significant pressure to the fish through his fingers. The pressure often results in crushing or splitting the fish making the bait fish virtually worthless. In a last frustrated attempt to get the baitfish, the angler will try to invert the net and let the contents of the net fall into his hand. Often the angler gets multiple fish in his hand and must either return all the baitfish to the bucket and start the process again or throw away all but one of the bait fish. The routine described above consumes time that anglers often do not have. For instance, when crappies are running, many anglers try to fish several poles. If it takes too long to bait a hook, then when a crappie hits a line in the water, because the angler is baiting a hook, he cannot get to another pole to set the hook and reel the crappie in.

Another problem is that if the baitfish is bigger than the net, which is often the case with chubs and suckers, it is easy to net only one, but it is usually too big for the net and the fish all too easily escapes. There are also long term problems with the prior art. Because nets are typically made of a fine mesh to trap the baitfish but to let the water escape, the nets often get torn. Many times they tear while being place in or removed from a tackle box. Additionally the nets can get fouled or clogged by having small particles like algae, seaweed, or even fish scales get trapped in the openings of the net.

Another problem with the construction of the fishnets is that they are often made of steel. Steel, if left uncoated, rusts. If the steel is coated, it makes the net more expensive. Additionally, the assembly of the fish net, that is the cost of connecting the net to the handle raises, increases the unit production cost.

SUMMARY OF THE INVENTION

The present invention recognizes and addresses the foregoing disadvantages, and other prior art methods.

Accordingly, It is an object of the invention to provide a new and improved fish catcher. Another object of the invention is to provide a fish catcher that is comparatively more economical to produce than the prior art.

A further object of the invention is to provide a baitfish catcher that does not rust. Another object of the invention is to provide a fish catcher that does not require the connection of a net to a frame or handle. Yet another object of the invention is to provide a fish catcher that more quickly catches the baitfish over the prior art.

A still further object of the invention is to provide a fish catcher that quickly releases the fish. Another object of the invention is to provide a fish catcher that releases the baitfish into your hand. And yet another object of the invention is to provide a fish catcher that self catches if left in a bucket of baitfish. Another object of the invention is to reduce the waste of baitfish.

A further object of the invention is to provide a fish catcher that does not deform. Still another object of the invention is to provide a sturdier fish catcher that does not tear.

These and other objects of the present invention are achieved by providing in a preferred embodiment of the invention a baitfish catcher that has a body that is tubular in shape that is made with opaque materials. The baitfish catcher has orifices or openings at both ends of the tube. At one end is an opening large enough to allow a fish to enter the tube. At the other end is a smaller orifice through which the fish can not exit the tube or body. The preferred embodiment of the invention has a handle connected to the body of the baitfish catcher.

Another exemplary embodiment is a baitfish catcher that is conical in shape that has an opening orifice and at least one drain orifice or port. It is preferably constructed from opaque rigid materials but it may also be made with translucent material or semi-rigid materials.

Other objects, features and aspects of the present invention are discussed in greater detail below.

Additional objects and advantages of the invention are set forth in the detailed description herein, or will be apparent to those of ordinary skill in the art. Also it should be appreciated that modifications and variations to the specifically illustrated and discussed structure may be practiced in various embodiments and uses of this invention without departing from the spirit and scope thereof, by virtue of present reference thereto. Such variations may include but are not limited to, substitution of equivalent structure for those shown or discussed and the repositioning of various elements, or the like.

DETAILED DESCRIPTION OF THE INVENTION

Figure 1:
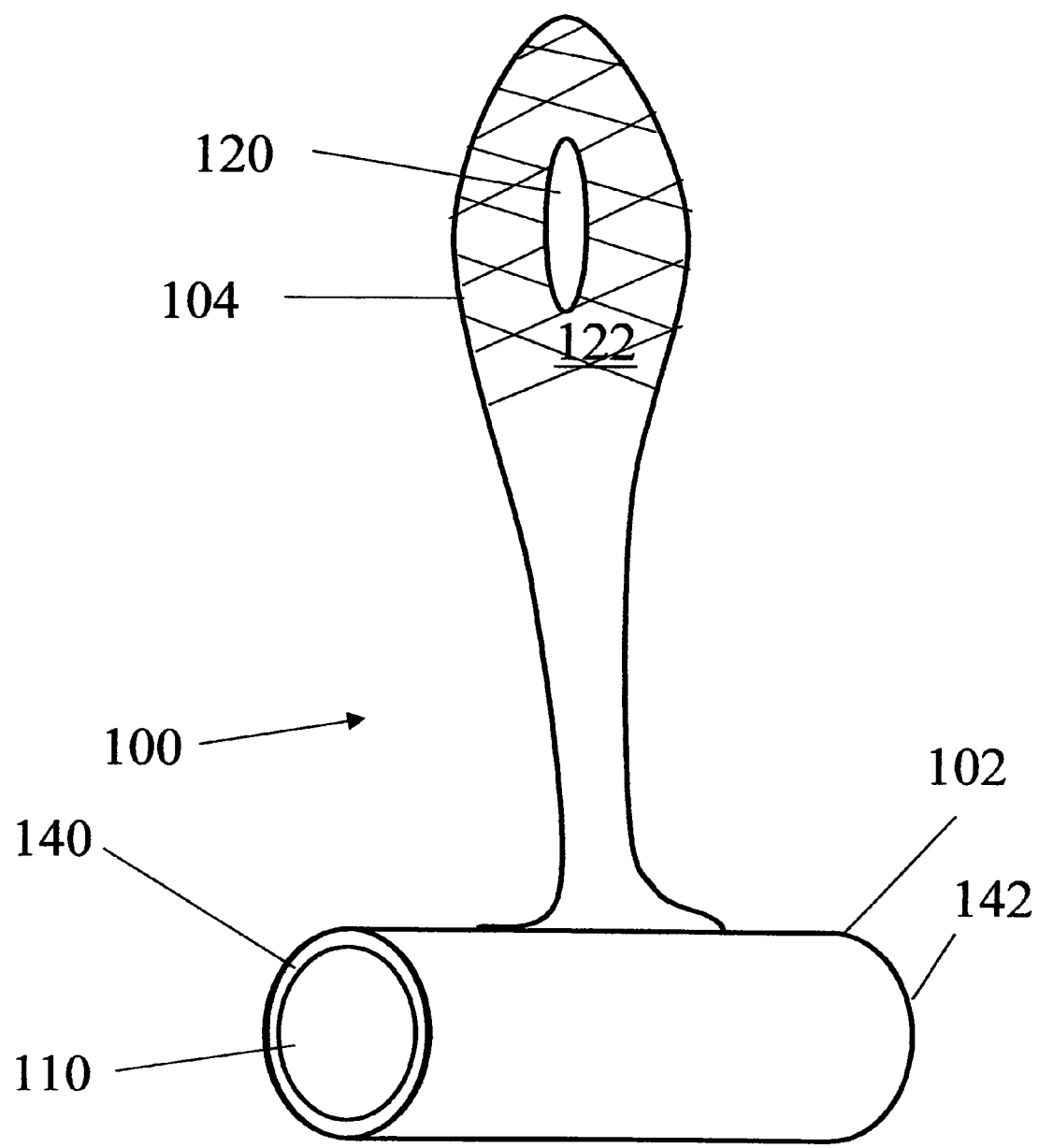
FIG. 1 is a perspective view of a preferred embodiment of the invention.

It is to be understood by one of ordinary skill in the art that the present discussion is a description of exemplary embodiments only and is not intended as limiting the broader aspects of the present invention. The broader aspects are embodied in the exemplary construction. Identical numbers shown in the drawings show the same element or parallel elements. Different numbers in the drawings are used for the clarification of elements.

Referring to FIG. 1, the fish catcher 100 has two primary components the body 102 and the handle 104. The handle 104 is connected to the body 102 so that one can lift or maneuver the body 102 with the handle 104. As shown in FIG. 1, the handle may be knurled 122 or otherwise formed or treated including having rubber attached making it non-slip so that it does not slip from a fishman's hand. Additionally, the fish catcher 100 may have an opening 120 in the handle to facilitate hanging the fish catcher in a display rack or on a nail or pin. Preferably, the handle 104 is made of a plastic that is shatter resistant and of course water proof and easily formed in to an ergonomical shape to make it comfortable to hold. Typically a plastic handle construction will be less expensive than any alternatives especially if the fish catcher can be made from a single pour mold.

The body 102 has is preferably tubular in shape for ease of manufacture; however, many shapes can be made that accomplish the objects of the invention. The tube shaped body 102 has two ends 140 and 142. In end 140 there is formed an opening 110. The opening should be slightly larger than the fish that is intended to be trapped in the fish catcher 100. In end 142 there is a second opening that is smaller than the fish that is intended to be trapped in the fish catcher (not shown in FIG. 1).

Figure 2:
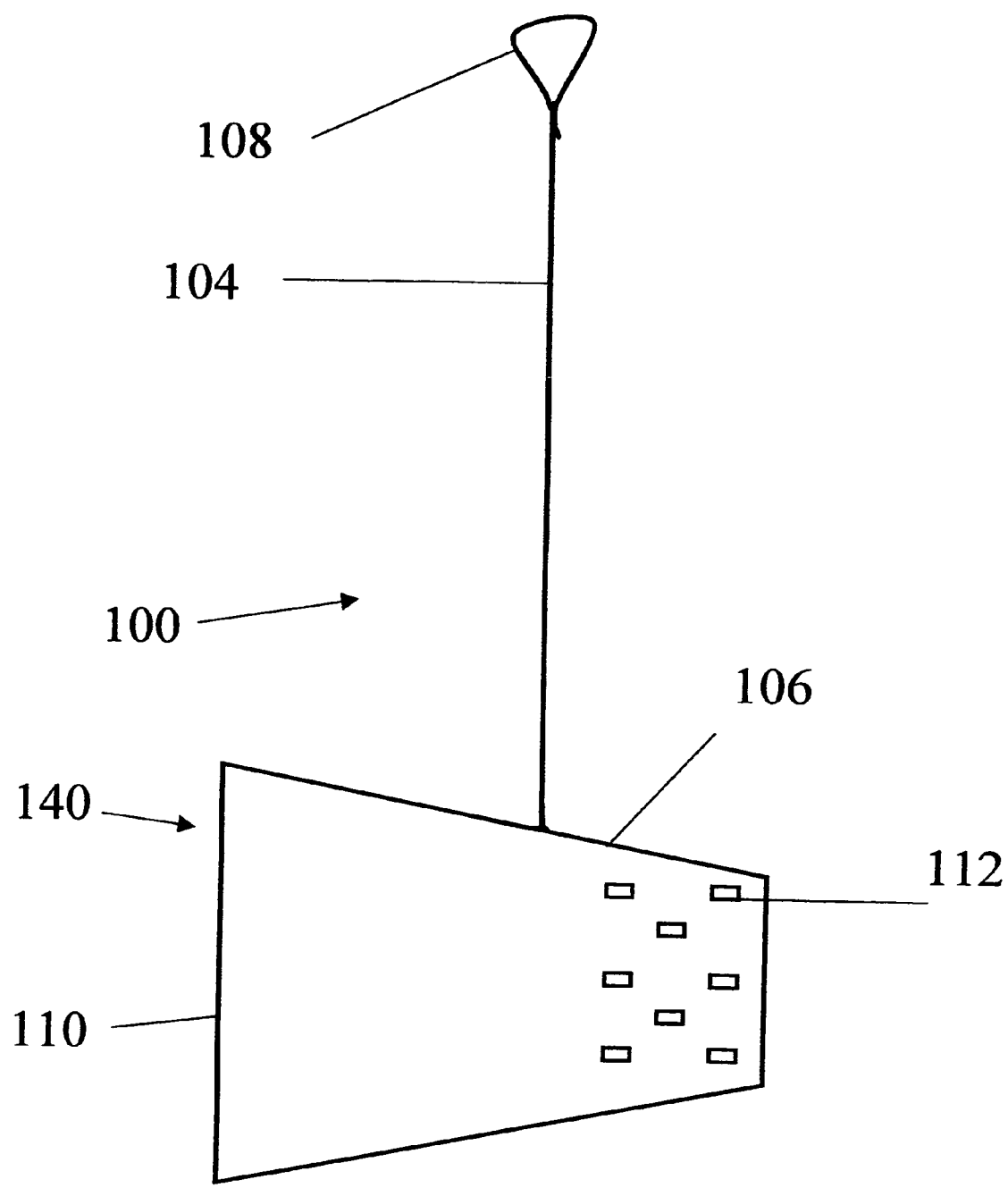
FIG. 2 is a perspective view of a second embodiment of the invention.
Figure 3:
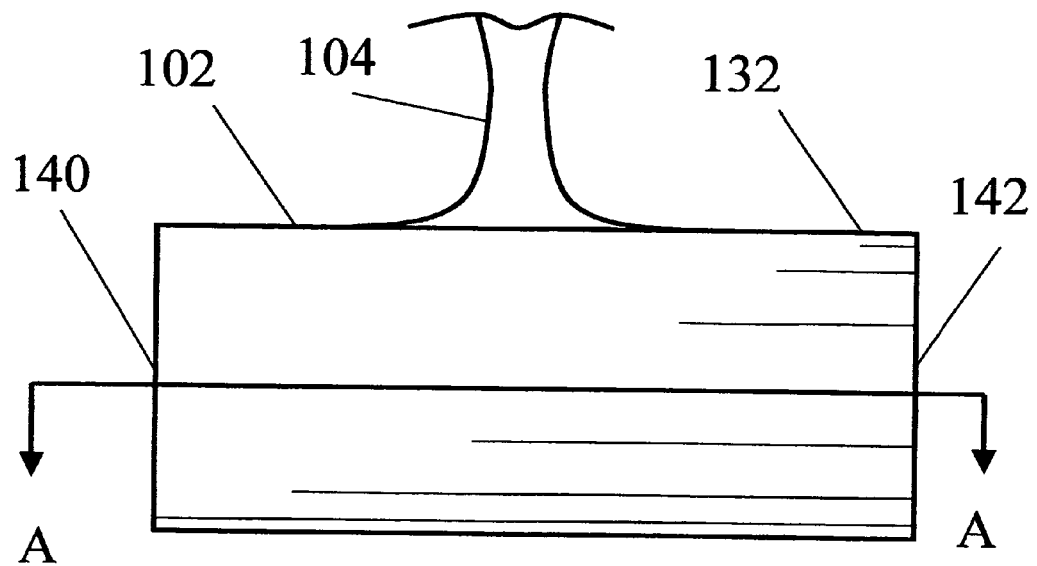
FIG. 3 is a partial perspective view of the body of an embodiment of the invention.

Referring to FIG. 2, the fish catcher 100 depicted is an alternate embodiment of the invention. The fish catcher has a handle 104 that is made of flexible stainless steel wire that will not rust when exposed to water. The handle 104 may be formed with an opening or eye 108 to facilitate the fisherman's grip on the fish catcher or to allow for easy storage of the fish catcher on a pegboard.

The handle 104 is connected to a body 106. The body 106 can be generally shaped as a hollow cone with the base 109 of the cone or frusto-conical body (hereinafter cone) 106 forming an opening that allows a fish access to the interior of the cone 106. The cone 106 has at least one drain vent 112 that allow water to drain from the cone when the cone is removed from the water. The vents should be large enough to allow the water to drain from the cone quickly and not be impeded by build-up caused by scales, algae or seaweed, but small enough to prevent any fish inside the body from escaping through one of the vents.

Figure 4:
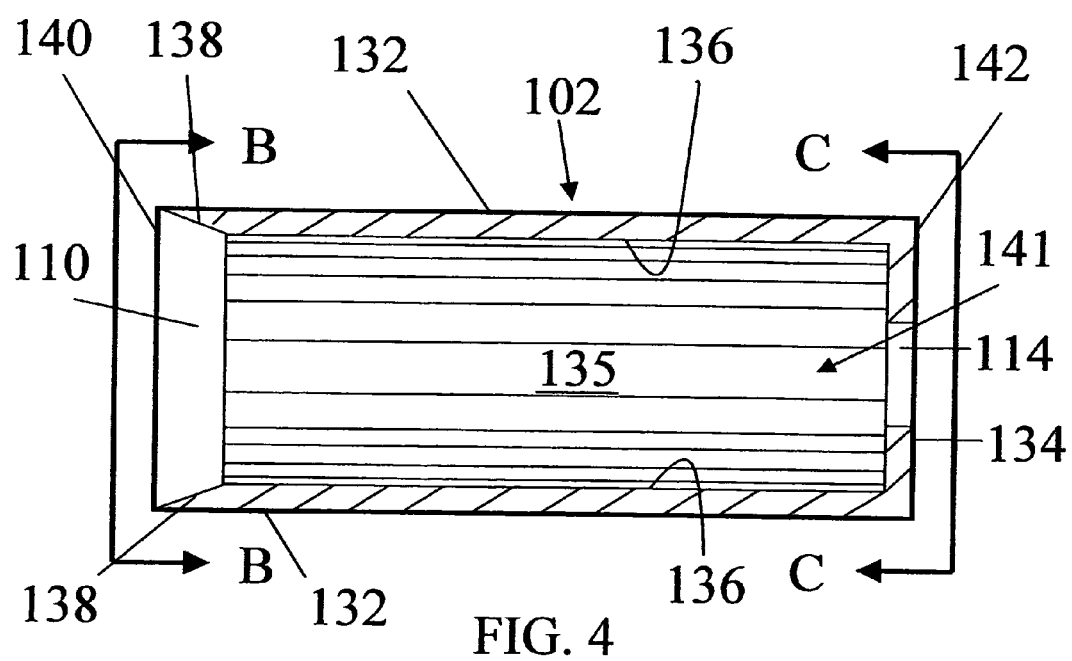
FIG. 4 is a sectional view taken along lines A-A in FIG. 3.
Figure 5:
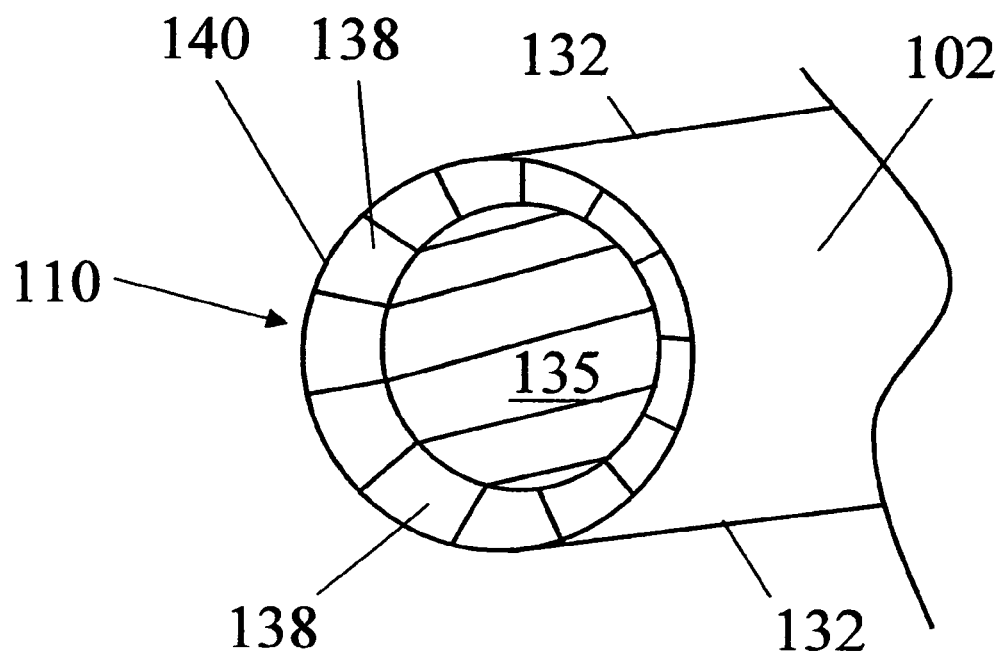
FIG. 5 is an end view taken along lines B-B in FIG. 4.
Figure 6:
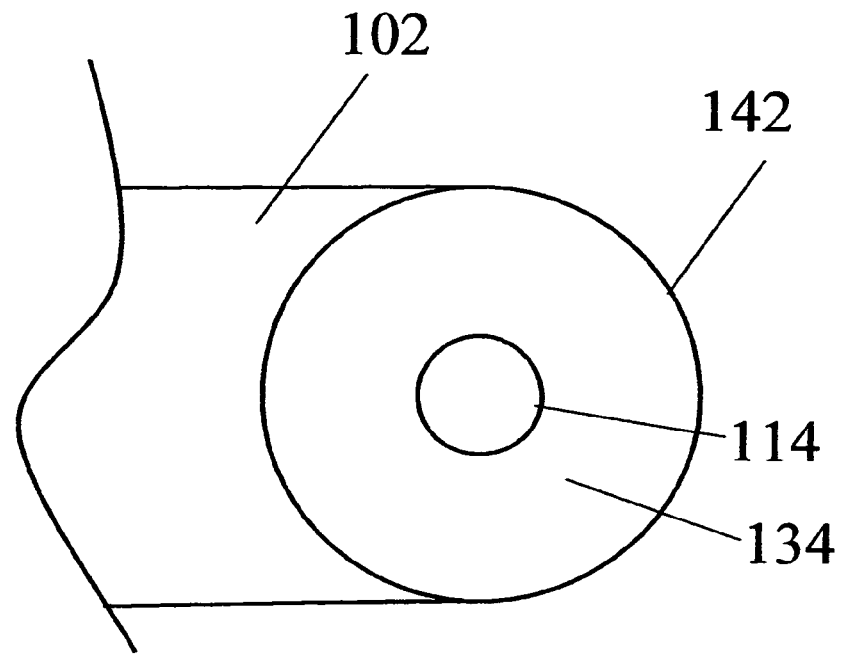
FIG. 6 is an end view taken along lines C-C in FIG. 4.

Referring now to FIGS. 3 and 4, and 5 and 6 which show more clearly ends 140 and 142, respectively, of body 102 that show enlarged views of the body 102 for the preferred embodiment of the invention. The body 102 is formed by an outer wall 132 and inner wall 136 with two ends 140 and 142. FIGS. 4, 5 and 6 clearly show the difference of the two ends of the preferred embodiment of the invention. End 140 of body 102 is the entrance for fish entering into the body. An opening 110 is formed in end 140. Preferably the opening 110 is at least as large as the inner chamber as defined by inner walls 136 so that when the fish is being removed from the inner chamber, it is not impeded by a lip. The opening 110 may be tapered like a funnel so that the opening is as large as the end 140 and is reduced in size to the dimensions of the inner chamber 141 with sides 138. The second end 142 of body 102 has an end wall or lip 134 that forms a small opening 114. The small opening 114 allows water to flow in and out of inner chamber 141, but does not allow a fish in the inner chamber 141 to leave through the opening 114. The inner wall 136 is preferably smooth.

In operation, the fish catcher simply works by immersing the device in a tank or bucket filled with multiple fish that are roughly the same size. The angler should choose an appropriately sized fish catcher so that only the fish trying to be caught fits inside the inner chamber 141. If they are all the same size, then any one fish will do. Although this has been designed for use with long baitfish, this invention is easily adapted to other fish as well, including fish in an aquarium. Preferably the fish catcher should be sized so that only one fish may enter the inner chamber at any given time. By placing the fish catcher in the bucket, the fish are given a place to hide. A fish will almost immediately swim through the opening 110 in end 140 and into inner chamber 141 seeking a place to hide. Unfortunately, this is probably the worst place for the fish to hide because instead of getting any protection, it is the next fish to be used as bait. The fish does not enter the fish catcher because of any bait in the device nor because of any action on the part of the fisherman other than putting the device in the container holding the fish.

When a fish is in the fish catcher, the angler grasps the handle 104 and move end 140 upward direction so that the water drains from ports or opening 114 and the fish cannot escape. The angler then takes the fish catcher and dumps the contents of the inner chamber directly into his hand so that if there is one or even two fish, he can easily catch it and bait his hook quickly. If the inner wall surface 136 is smooth, then the fish comes out more easily. If the opening 110 is smaller than the inner chamber 141, then the fish may get trapped inside the fish catcher. To ensure the easiest operation, the opening 110 should be at least as big as the inner chamber 141.

Additionally, the material selected to make the body 102, is important to give the fish the sense that they are hiding inside the inner chamber. The best way to do this is to make the body opaque; however, a translucent and transparent body is also within the scope of the invention.

I claim:
1. A handheld fish catching device comprising:
   a handle including a first handle end and an opposing second handle end, and
   a body wherein the body is a tube having a solid, side wall, unitary construction, a first body end and an opposing second body end, said side wall having a uniform diameter and extending from said first body end to said second body end, said first body end defining a first opening having a first diameter that is substantially the same as a width of a fish and enables the fish to enter said tube and to be removed from said tube, said second body end including a fixed end wall constructed to prevent the fish from exiting or being removed from said second body end, said fixed end wall defining a single, second opening having a second diameter, said second diameter being less than said first diameter and less than the width of the fish to prevent the fish from exiting through said second opening, wherein said first handle end is non-rotatably connected to a point on along an outer surface of said body about midway between said first body end and said second body end and is constructed to prevent the fish from entering said first handle end.

2. The fish catching device according to claim 1, wherein the body is made of plastic.

3. The fish catching device for catching fish according to claim 2, wherein the plastic is opaque.

4. The fish catching device according to claim 1, wherein the handle and body are made of plastic.

5. The fish catching device according to claim 1, wherein the handle has non-slip features.

6. A handheld fish catching device comprising:
a handle with a slip resistant surface, said handle including a first handle end and an opposing second handle end, said first and second handle ends being the outermost ends of said handle, said first handle end defining an opening, said second handle end being distally located from said first handle end and including a solid end wall constructed to prevent a fish from entering said second handle end; and
a body of unitary construction, said first and second handle ends being on a same side of said body, said second handle end being non-rotatably connected to a point in a middle portion of said body having a uniform diameter, said body including a first body end, a second body end and an aperture-free sidewall extending between said first body end and said second body end, said body defining a solid outer wall and a solid inner wall, said inner wall being generally smooth and forming a longitudinal chamber within said body, said first end of said body defining a first opening having a first diameter that is substantially the same as a width of a fish and enables the fish to enter said chamber and to be removed from said chamber, said chamber is of a sufficient length so that at least a substantial portion of the length of the fish is in said chamber, and said second end of said body having a fixed end wall defining a single, unobstructed second opening having a second diameter that is less than the first diameter and less than the width of the fish to prevent the fish from exiting or being removed from said second end of said body.

7. A handheld fish catching device comprising:
a handle having a first proximal end and a second distal end; and
a unitary body having a uniform diameter and defining a longitudinal axis, said first proximal end of said handle being non-movably connected to a middle portion of a perimeter of said body along an outer surface thereof and being constructed to prevent a fish from entering said handle, said first proximal end and said second distal end being on a common side of said body relative to said longitudinal axis, said body having a first end, an opposing second end and a solid, aperture-free side wall between said first end and said second end, wherein said first end of said body defines a first opening having a first diameter that is substantially the same as a width of the fish and enables the fish to swim through said first opening and into said body without bait and to be removed from said body and wherein said second end includes a fixed end wall defining a single, unobstructed second opening having a second diameter that is less than the first diameter and less than the width of the fish to prevent the fish from exiting or being removed from said second end of said body.

8. The fish catching device according to claim 7 wherein the body is semi-rigid.

9. The fish catching device according to claim 7 wherein the body is opaque.

10. The fish catching device according to claim 7 wherein the handle is semi-rigid.

11. The fish catching device according to claim 7 wherein the body is a tube.

* * * * *